(12) United States Patent
Kelly et al.

(10) Patent No.: US 6,178,206 B1
(45) Date of Patent: Jan. 23, 2001

(54) METHOD AND APPARATUS FOR SOURCE SYNCHRONOUS DATA TRANSFER

(75) Inventors: Timothy W. Kelly; Stephen S. Pawlowski, both of Beaverton; Keith M. Self; Jeffrey E. Smith, both of Aloha, all of OR (US)

(73) Assignee: Intel Corporation, Santa Clara, CA (US)

( * ) Notice: Under 35 U.S.C. 154(b), the term of this patent shall be extended for 0 days.

(21) Appl. No.: 09/013,479

(22) Filed: Jan. 26, 1998

(51) Int. Cl.[7] ................................................ H04L 25/00
(52) U.S. Cl. ......................... 375/257; 375/377; 375/219
(58) Field of Search ................................... 375/377, 356, 375/220, 257, 219; 713/400, 401, 500, 501, 502, 503, 600, 601; 710/61, 100, 106, 107, 126, 58, 105; 395/280, 285, 286, 306, 309

(56) References Cited

U.S. PATENT DOCUMENTS

| | | | |
|---|---|---|---|
| 5,132,987 | * 7/1992 | Motohashi et al. | ................... 375/211 |
| 5,239,638 | * 8/1993 | Pawlowski et al. | ................... 711/169 |
| 5,301,365 | * 4/1994 | Hess et al. | ............................... 455/73 |
| 5,498,886 | * 3/1996 | Hsu et al. | ............................. 257/213 |
| 5,675,811 | * 10/1997 | Broedner et al. | ............... 395/750.05 |
| 5,706,484 | * 1/1998 | Mozdzen et al. | ..................... 395/551 |
| 5,892,926 | * 4/1999 | Witkowski et al. | ................. 395/280 |
| 5,964,845 | * 10/1999 | Braun et al. | .......................... 709/400 |

* cited by examiner

Primary Examiner—Don N. Vo
(74) Attorney, Agent, or Firm—Kenyon & Kenyon

(57) ABSTRACT

A method and apparatus is presented where for transmitting data between two or more components. Data signals are sent in parallel with a clocking signal (e.g., on a bus) so that the data signal can be latched in relation to the clocking signal. For example, two clocking signals, out of phase from each other by 180 degrees, can be sent on bidirectional clocking signal lines and data signals can be sent on a data signal line, the component receiving the clocking and data signals can latch the data signals on each high-to-low transition of either of the two clocking signals. Using the method and apparatus of the present invention, skew problems seen with other bus systems can be reduced which leads to an increase in data transfer rates.

14 Claims, 10 Drawing Sheets

METHOD AND APPARATUS FOR SOURCE SYNCHRONOUS DATA TRANSFER

BACKGROUND OF THE INVENTION

The present invention pertains to a method and apparatus for source synchronous data transfer. More particularly, the present invention pertains to the transfer of data signals or the like from a first component with a clocking signal to a second component.

A bus is a common way to couple two or more components together to allow communication among them. A bus typically includes one or more signal lines that are coupled to each component. A signal line of the bus typically carries data, address, or control information (e.g., in a binary format).

A synchronous bus is one where components transmit and receive signals to/from the bus in synchronism with a common clock signal (e.g., a square wave with a 50% duty cycle). For example, a transmitting component may place data signals onto the bus at a time near the rising edge of a clock cycle, and a receiving component may receive and latch these data signals from the bus at a time near the rising edge of the next clock cycle. There are several problems present when using a synchronous bus. First, the conductors (e.g., conductive traces) between the common clock and the bus components may not be exactly matched. For example, the conductive traces may not have the same length. This leads to what is known in the art as clock skew, where a first component perceives a rising edge of the common clock at a different moment in time than a second component. Because of clock skew, tolerances must be built into a bus system to allow for the receiving component to receive data from a transmitting component over the bus at an appropriate time. One way to compensate for clock skew is to lower the bus clock frequency so that a large window of time is available for receiving signals from the bus.

In several known systems for transmitting signals between two components, the problem of clock skew is solved by providing a dedicated clock signal line between the components. For example, in one system, a dedicated clock signal line and dedicated data signal lines are provided for sending signals from a first component to a second component. Conversely, a different dedicated clock signal line and different dedicated data signal lines are provided for sending signals from the second component to the first component. The clock signals in this system are free-running clock signals that are continuously generated by the first and second components whether data signals are being transmitted or not. With this system, the first component drives data signals onto the dedicated signal line in relation to the clocking signal that appears on the clock signal line. The second component receives and latches the data signals at a point in time in relation to the same clocking signal. In another known system similar to the one described above, the dedicated data signal lines are combined to form a set of bidirectional data signal lines. Again, when a first component seeks to send data to a second component, it is done relative to the clock signal that is being continuously transmitted over the dedicated clock signal line.

The above described systems acceptably reduce clock skew for the transfer of data signals between two components. Expanding such systems to provide for the transfer of data signals among three or more components creates several problems. First, a dedicated clock signal would need to be provided between every two components which increases the number of connections (e.g., conductive traces) between components and the number of conductive input/output (I/O) pins needed on each component. Second, if the data signal lines are provided as a bus coupled to each component, then there is a problem of clock skew because the clock signal line and data signal lines between any two components may not match. Alternatively, dedicated data signal lines could be provided between every two components, however doing so would increase the number of connections between components and the number of conductive I/O pins needed on each component.

In view of the above, there is a need for a method and apparatus for transmitting data from one component to another that overcomes the above identified problems.

SUMMARY OF THE INVENTIONS

According to an embodiment of the present invention, an apparatus is provided for transferring data signals between two components. The apparatus includes first and second components, at least one data signal line and at least one bidirectional clocking signal line coupled between the first and second components. Each of the first and second components is adapted to transmit data signals over the data signal line and at least one clocking signal over the clocking signal line to another of the first and second components. Also, each of the first and second components is adapted to receive and latch data signals in relation to a clocking signal received from the other of the first and second components.

DETAILED DESCRIPTION

Figure 1:
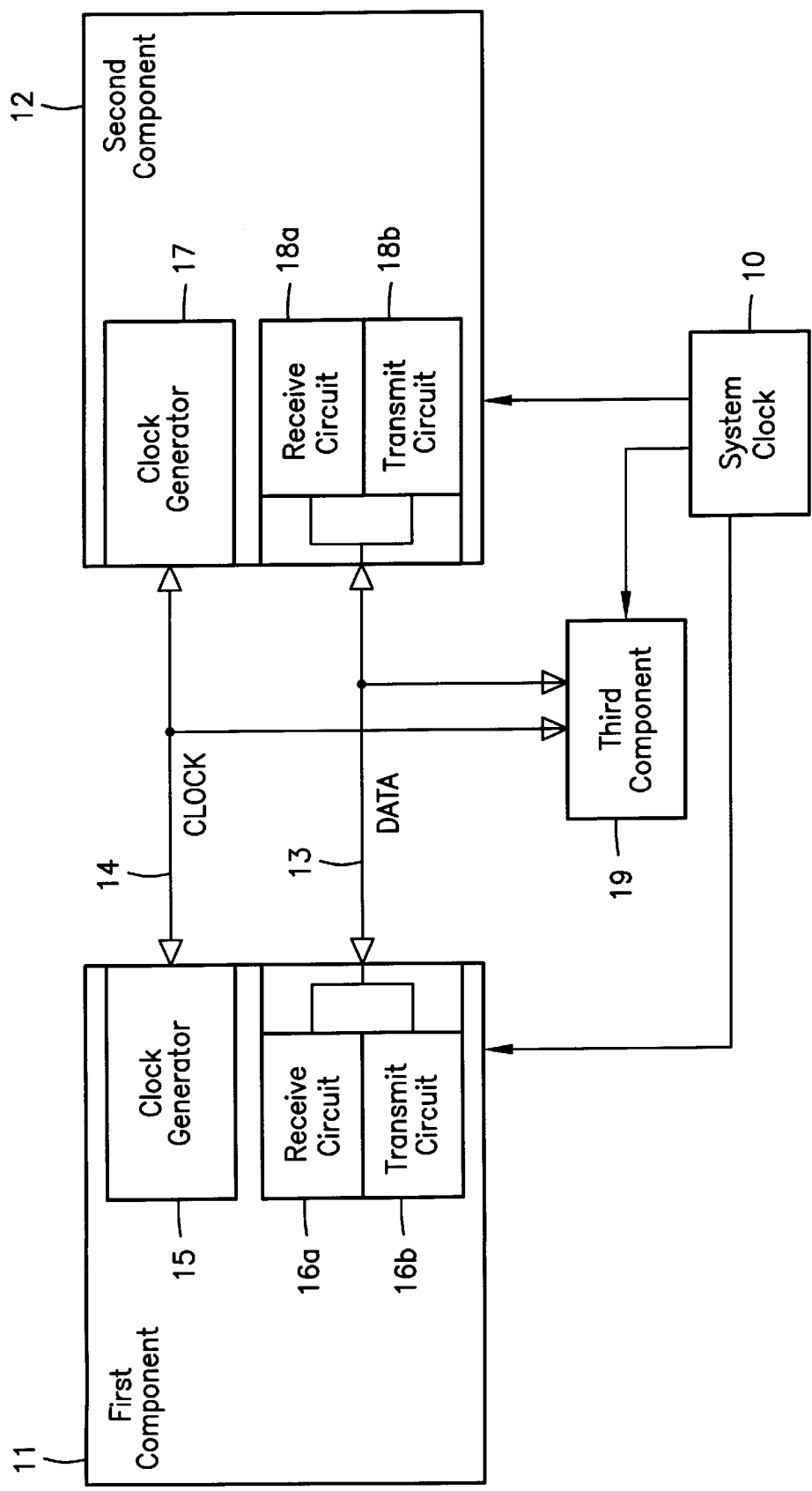
FIG. 1 is a block diagram of an apparatus for transferring data between components constructed according to an embodiment of the present invention.

Referring to FIG. 1, a block diagram of an embodiment of the present invention is shown. In FIG. 1, a first component 11 is coupled to a second component 12 via one or more data signal lines 13 and one or more clocking signal lines 14. A system clock 10 provides a clocking signal to first and second components 11, 12. When first component 11 seeks to transmit data to second component 12, it drives the appropriate data signals onto line 13 along with a clocking signal onto clocking signal line 14. Second component 12 receives and latches (e.g., via receive circuit 18a) the data from the data signal line(s) 13 in relation to the clocking signal appearing on clocking signal line 14. For example, the first component 11 can drive data signals onto data signal lines 13 via a transmit circuit 16b and send out a clocking signal via clock generator 15, and the second component can receive and latch this data during high-to-low transition of the same clocking signal. The manner for transmitting data signals from one component to another can be referred to as "source synchronous" because the latching of data signals at the receiving component is synchronized to a clocking signal from the transmitting (or source) component. One skilled in the art will appreciate that other types of signals other than data signals can be sent from first component 11 to second component 12 such as control signals, address signals, etc. Accordingly, as used herein the terms "data" and "data signals" include control, address, and other such signals.

Figure 2:
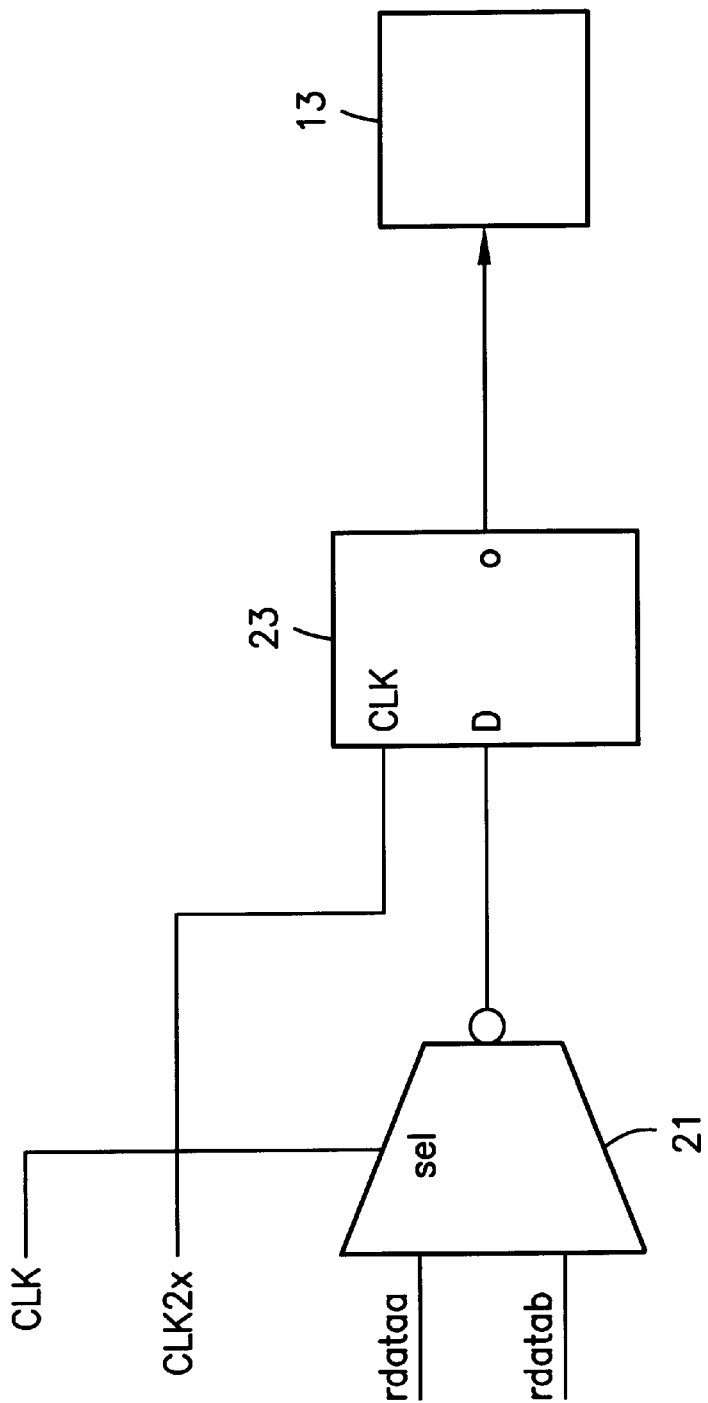
FIG. 2 is a circuit diagram showing an example of a transmit circuit for the apparatus of FIG. 1.

Referring to FIG. 2, a circuit diagram of a transmit circuit (such as elements 16b and 18b in FIG. 1) according to an embodiment of the present invention is shown. In this example, data to be driven onto the data signal lines is provided at inputs "rdataa" and "rdatab" and are supplied to inputs of a multiplexer 21. The "select" input to multiplexer 21 is supplied by a first clock signal "clk." Accordingly, as the clk signal transitions between high (i.e., logical "1") and low (i.e., logical "0") values, the data appearing at the inputs rdataa and rdatab are supplied to the output of multiplexer 21. The output of multiplexer 21 is supplied to the D input of a flip-flop 23. In this embodiment, flip-flop 23 is a rising-edge-triggered master-slave flip-flop. The clock input of flip-flop 23 is coupled to a source that is supplying a signal "clk2x" which, in this example, has a frequency twice that of the clk signal described above. The output of flip-flop 23 is then data from dataa and datab and is supplied to data signal lines 13 at a rate twice that of the frequency of the clk signal.

Figure 3A:
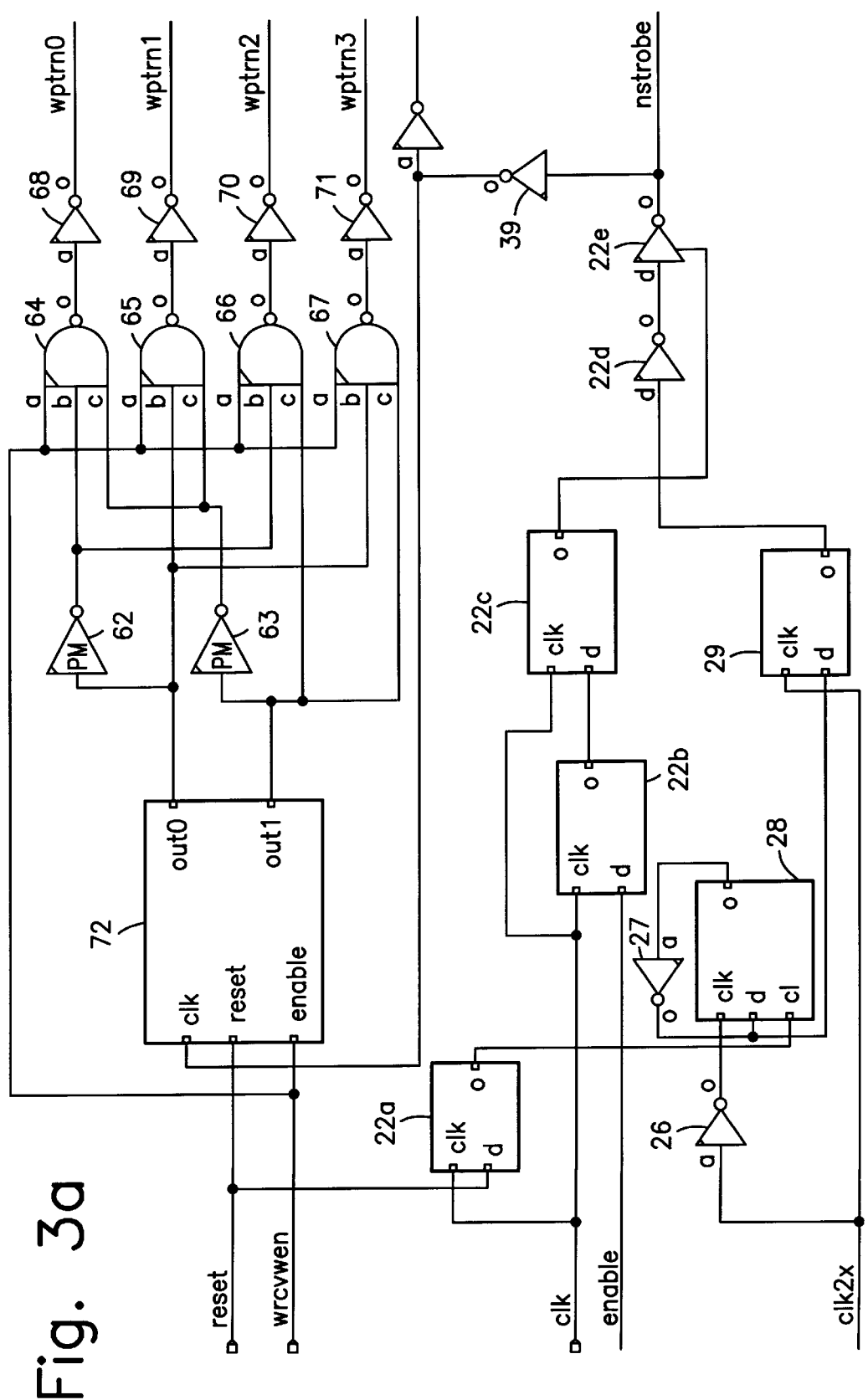
FIGS. 3a–b are circuit diagrams showing examples of clock generators of the apparatus of FIG. 1.
Figure 3B:
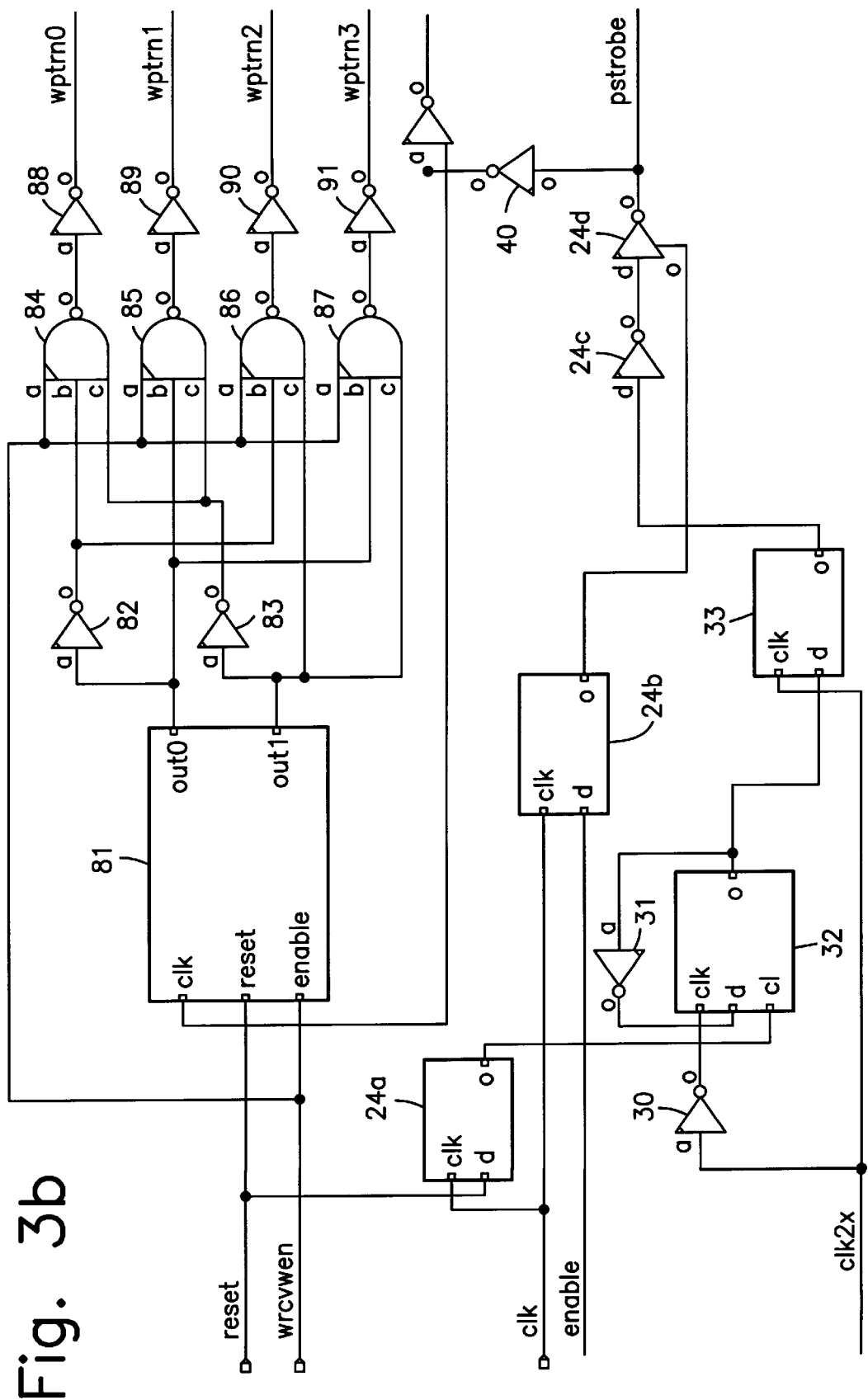

Referring to FIGS. 3a–b, an example of a clock generator (e.g., elements 15 and 17 in FIG. 1) constructed according to an embodiment of the present invention is shown. Referring to FIG. 3a, a clock signal (such as clk2x) is provided as the clock (ck) input of a rising-edge-triggered master-slave flip-flop 28 via an inverter 26. In this embodiment, the frequency of the clk2x signal is 200 MHZ. The output (o) of flip-flop 28 is supplied to the D input of flip-flop 28 via inverter 27 and the D input of a falling-edge-triggered master-slave flip-flop 29. The clk2x signal is also supplied to the clock (ckb) input of flip-flop 29. The output of flip-flop 29 is a clock signal with a frequency of 100 MHz and can be supplied through inverter 22d and tri-state buffer 22e to drive the clocking signal, "nstrobe." For reset purposes, a reset signal can be supplied to the D input of a flip-flop 22a, and the clk signal can be supplied to the ck input of flip-flop 22a. When a reset signal is asserted, flip-flop 22a synchronizes that signal with the clk signal and supplies it to the "cl" (clear) input of flip-flop 28 to reset that device. Also shown in FIG. 3a, a flip-flop 22b may be provided to receive an "enable" signal at its D input and the clk signal at its "ck" input. The output of flip-flop 22b is supplied to the D input of latch 22c which also receives the clk signal at its "ckb" input. The output of latch 22c is supplied to tri-state buffer 22e which controls the driving of the nstrobe signal onto a clocking signal line. In effect, latch 22c delays the driving of the nstrobe signal as described below with respect to FIG. 5.

In a further embodiment of the present invention, a second clocking signal is generated and sent with the data signal(s) and can be generated with the circuit of FIG. 3b. As in the example of FIG. 3a, the clk2x signal is provided to the ck input of a rising-edge-triggered master-slave flip-flop 32 via an inverter 30. Also, the output of flip-flop 32 is supplied to the D input of flip-flop 32 via inverter 31. The non-inverted output of flip-flop 32 is supplied to the D input of a falling-edge-triggered master-slave flip-flop 33. The output of flip-flop 33 is also a clock signal with a frequency of 100 MHz, but is out of phase with the output of flip-flop 29 (FIG. 3a) by 180°. This output of flip-flop 33 can be supplied through inverter 24c and tri-state buffer 24d to drive the clocking signal, "pstrobe." For reset purposes, a reset signal can be supplied to the D input of a flip-flop 24a, and the clk signal can be supplied to the ck input of flip-flop 24a. When a reset signal is asserted, flip-flop 22a synchronizes that signal with the clk signal and supplies it to the "cl" (clear) input of flip-flop 32 to reset that device. Also shown in FIG. 3b, a flip-flop 24b may be provided to receive an "enable" signal at its D input and the clk signal at its "ck" input. The output of flip-flop 24b is supplied to tri-state buffer 24d which controls the driving of the pstrobe signal onto a clocking signal line.

Figure 4:
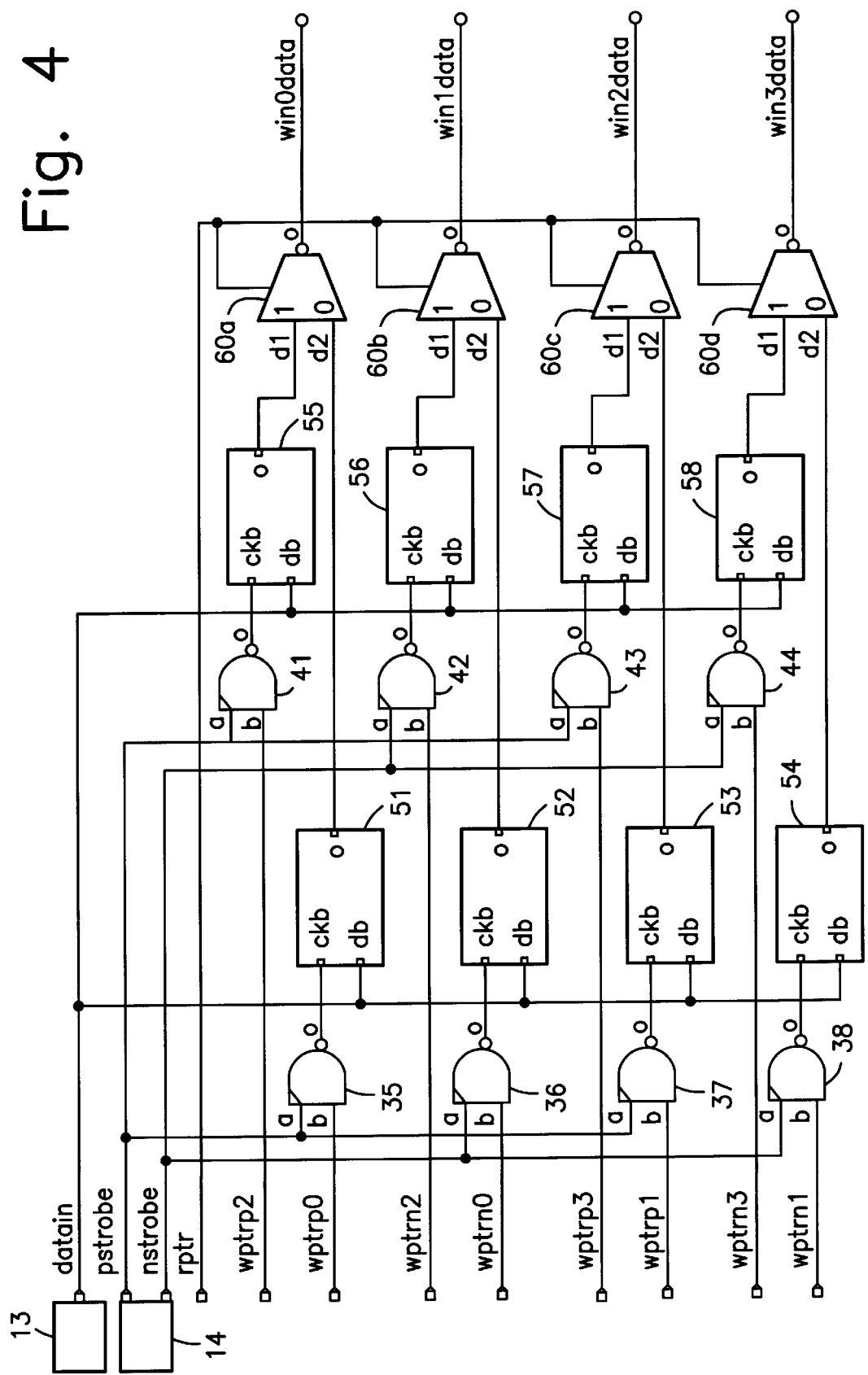
FIG. 4 is a circuit diagram showing an example of a receive circuit for the apparatus of FIG. 1.
Figure 5A:
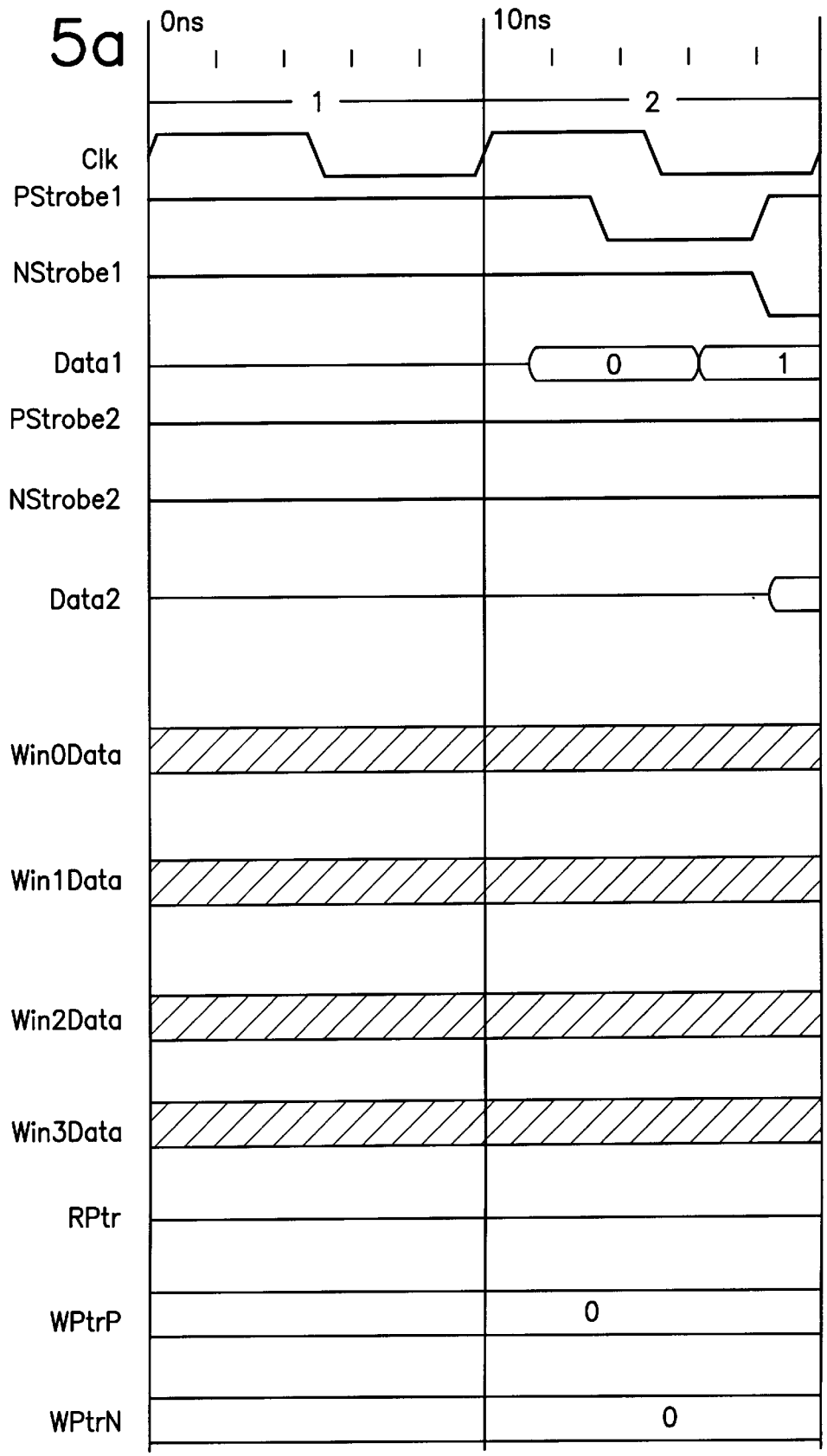
FIG. 5 is a timing diagram showing the relationship between various signals used in the apparatus of FIG. 1.
Figure 5B:
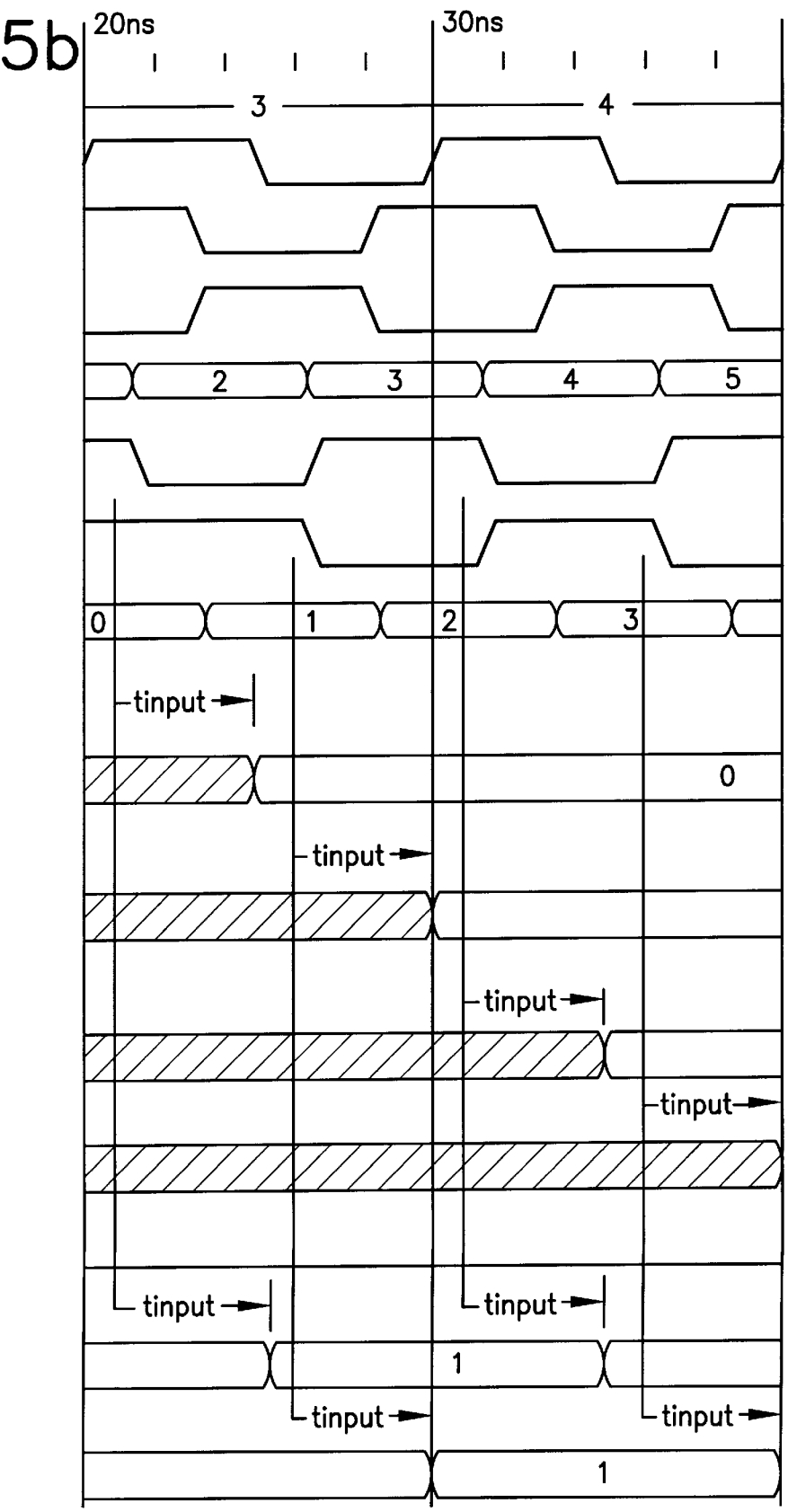
Figure 5C:
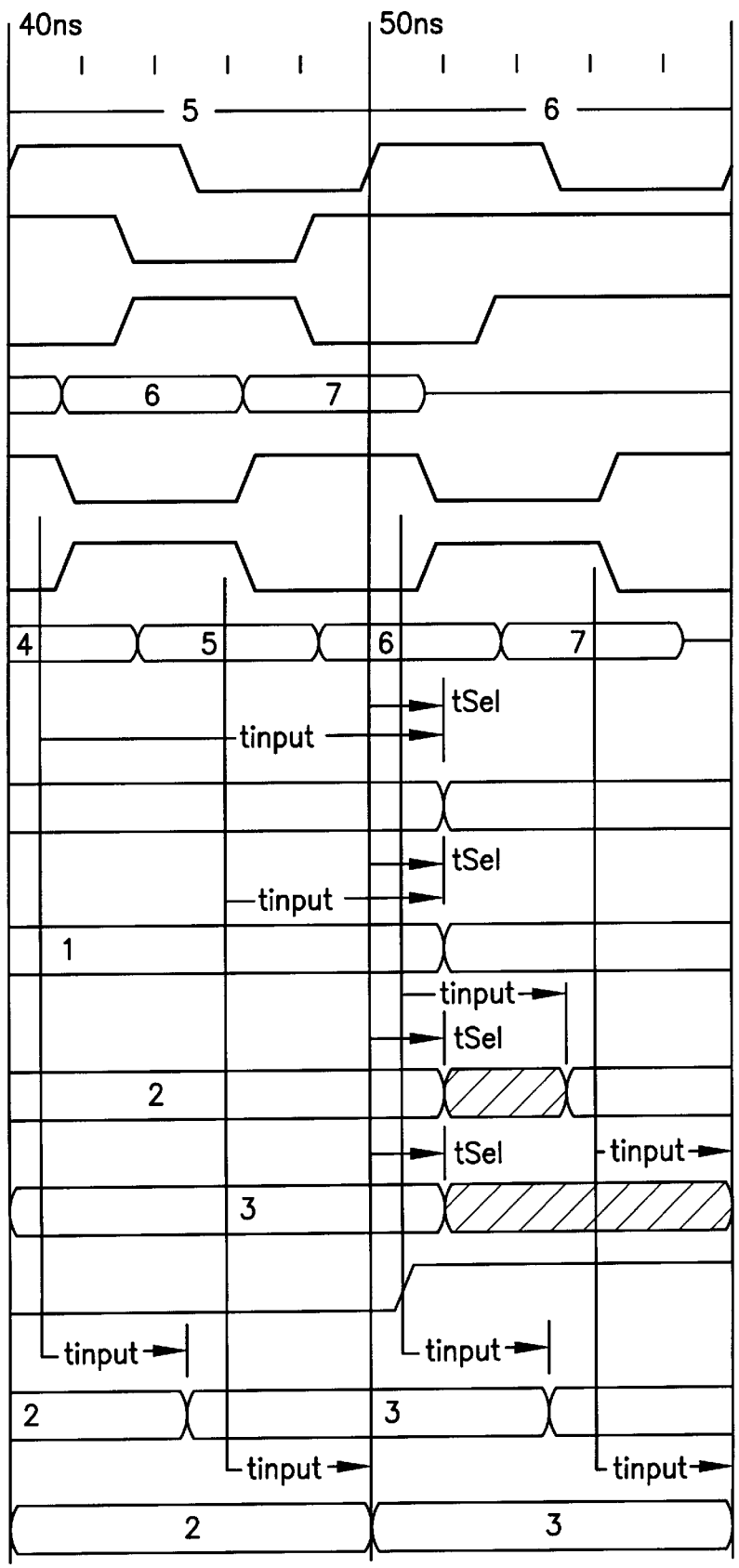
Figure 5D:
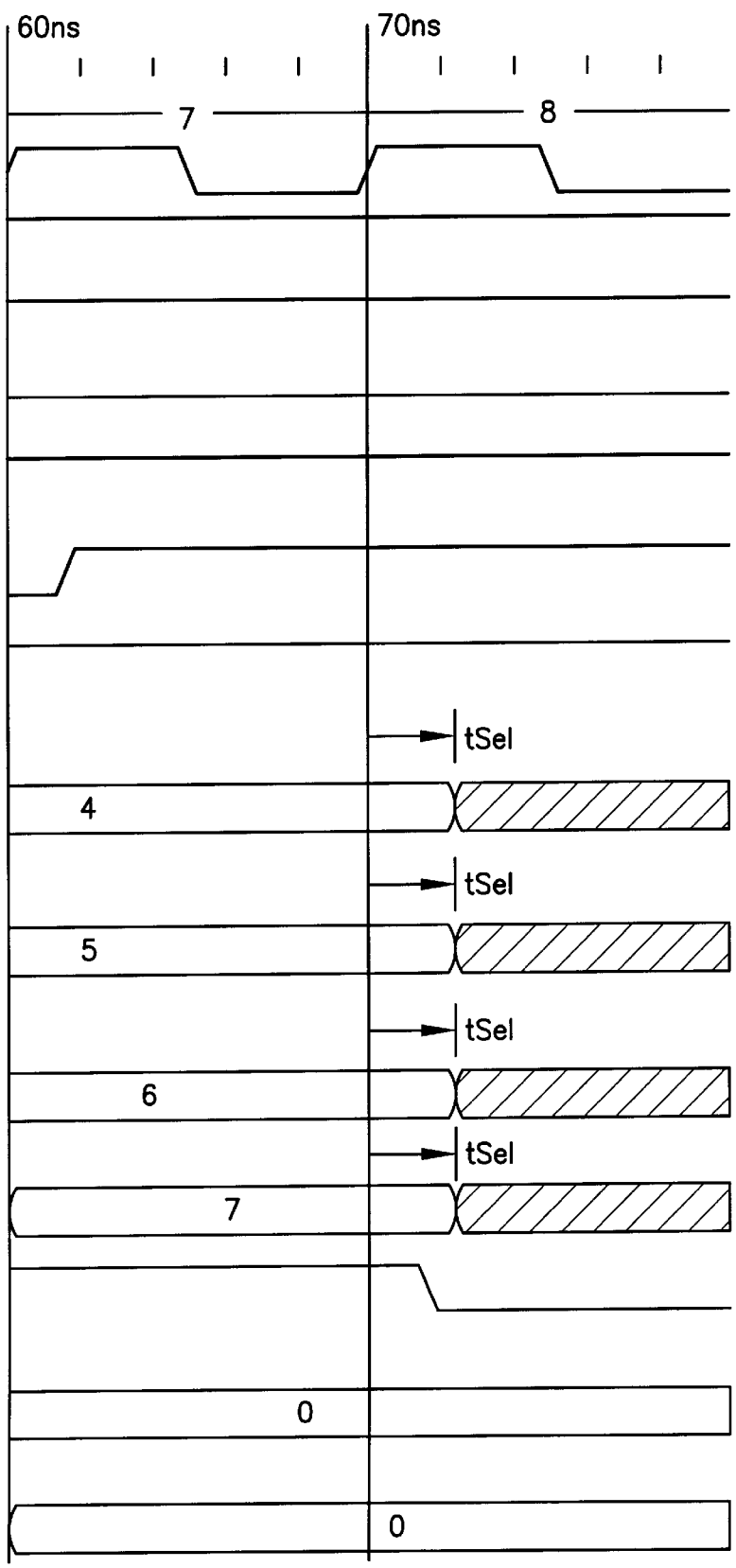

An example of a receive circuit (e.g., elements 16a and 16b in FIG. 1) for eight bits of data is shown in FIG. 4. In this example, a serial stream of data bits is supplied from data signal lines 13 (see FIG. 1) as the input "datain," which is supplied to the "db" input of a plurality of data-inverting latches 51–58. The pstrobe signal from one of the clocking signal lines 14 (e.g., via the clock generator circuit of FIG. 3b) is supplied to an input of NAND gates 35, 37, 41, and 43. The nstrobe signal from another of the clocking signal lines (e.g., via the clock generator circuit of FIG. 3a) is supplied to an input of NAND gates 36, 38, 42, and 44. The other inputs of NAND gates 35–38 and 41–44 are coupled to a number of write pointer signals as further described below.

Referring back to FIG. 3a, the clock generator at the component receiving the data signals can be modified to generate four of the write pointer signals used in the circuit of FIG. 4. In this example, a two-bit counter 72 generates a two bit value that changes upon the receipt of the nstrobe signal via inverter 39 from a clocking signal line. When receiving the nstrobe signal, tri-state buffer 22e should be in a tri-state condition. The first output (out0) of counter 72 is provided to inputs of NAND gates 65 and 67, as well as to inputs of NAND gates 64 and 66 via inverter 62. The second output (out1) is provided to an input of NAND gates 66 and 67, as well as to an input of NAND gates 64 and 65 via inverter 63. The remaining inputs of NAND gates 64–67 can be supplied by a write receiver enable ("wrcven") signal, where a low value for this signal ensures that the outputs of NAND gates 64–67 are always at 1 (i.e., a high value). The outputs of NAND gates 64–67 are provided to inverters 68–71 which generate write pointer signals, wptrn0, wptrn1, wptrn2, and wptrn3. In summary, elements 62–71 function as a 2-to-4 decoder. When the output of counter 72 has a value 00, only the wptrn0 signal is asserted, when the out1 signal has a 1 value and the out0 signal has a 0 value, the wptrn0 signal transitions to a low value and the wptrn1 signal transitions to a high value. Accordingly, in response to each nstrobe signal a different write pointer signal is asserted.

Referring to FIG. 3b, the clock generator circuit can be further modified to generate another set of write pointer signals. The pstrobe signal is supplied to the clk input of a two-bit counter 81 via inverter 40 from a clocking signal line. When receiving the pstrobe signal, tri-state buffer 24d should be in a tri-state condition. The outputs of counter 81 are provided, non-inverted and inverted by inverters 82–83, to NAND gates 84–87 in manner similar to what is shown in FIG. 3a. Also, the outputs of NAND gates 84–87 are provided to inverters 88–91 to generate write pointer signals, "wptrp0," "wptrp1," "wptrp2," and "wptrp3," respectively.

Referring to FIG. 4, write pointer wptrp0 is generated and supplied with the pstrobe signal as inputs to NAND gate 35, the output of which is coupled to the "ckb" input of latch 51. Latch 51 is transparent when the ckb input is at 0. Accordingly, when both the pstrobe and wptrp0 signals are asserted, the data from datain passes through the db input to the output of latch 51. At some later point in time, the pstrobe signal transitions to a low value, and this output is latched. A small delay later, the wptrp0 signal transitions to a low value as well.

The nstrobe signal then transitions to a high value and the write pointer signal wptrn0 signal is generated. The wptrn0 and nstrobe signals are supplied as inputs to NAND gate 36 which generates a low signal when both inputs are at a high value. As with latch 51, the output from datain passes through input db of latch 52 to the output and is latched when the nstrobe signal transitions from a high value to a low value (i.e., the ckb input goes to a high value). Then, the pstrobe signal transitions to a high value as well as the wptrp1 signal and these two signals are provided as inputs to NAND gate 37. When both input signals are at a high value, the data from datain passes through the db input to the output of latch 53 and is latched when the pstrobe signal transitions to a low value. The aforementioned procedure is repeated for each of the latches 54–58 and NAND gates 38 and 41–44. Accordingly, one bit of data is latched for each transition of the pstrobe and nstrobe signals from high values to low values. Data supplied by the datain path can be cyclically latched by latches 51–58 in relation to the nstrobe and pstrobe clocking signals and the wptrp and wptrn write pointer signals.

Referring again to the receive circuit of FIG. 4, the four bits of data are latched in latches 51–54 based on the pstrobe and nstrobe clocking signals. Accordingly, the four bits of data are latched in two cycles of the main clocking signal (which in this example has a frequency of 100 MHZ). In the example of FIG. 4, the data output from latches 51–54 are supplied to a first input of multiplexers 60*a–d*. The output from latches 55–58 are supplied to a second input of multiplexers 60*a–d*. The select input for multiplexers 60*a–d* is supplied as a read pointer signal "rptr." In this example, the rptr signal is supplied by the receiving component and may have a frequency that is in phase with the system clock signal with a frequency of 100 MHZ. In this example, the rptr signal has a frequency of approximately 50 MHZ. Accordingly, during the first half of each cycle of the system clock, data from the first inputs of multiplexers 60*a–d* is supplied as four bits of data to signal lines "data0," "data1," "data2," and "data3." During the second half of each cycle of the system clock, data from the second inputs of multiplexers 60*a–d* is supplied to the same signal lines.

Referring to FIG. 5, a timing diagram for the transfer of eight bits of data from a first component to a second component over a data signal line is shown. The "clk" signal refers to a the system clock signal that is supplied to both the first component and second components. In this example, the frequency of the system clock is 100 MHZ and has a period of 10 ns. In this embodiment, when the system clock transitions from a high value to a low value at t=10 ns, the first component drives a first data signal (e.g., one bit of data) onto a data signal line ("data1"). At approximately the first quarter of the system clock cycle, the first component transitions the pstrobe signal to a low state indicating that valid data appears on the data signal line (see "pstrobe1"). The data signal and the pstrobe signal are received at the second component at some delay time later, and are indicated in FIG. 5 as the "pstrobe2" and "data2" signals.

Referring back to FIG. 4, the first data signal is received at the input of latches 51–58, and in particular latch 51. Subsequently, the pstrobe and wptrp0 signals will both have high values and the input data signal will appear at the output of the latch 51.

As shown in FIG. 5, the write pointer count for the pstrobe signal ("wptrp") is set to 0 (i.e., the two-bit counter 72 in FIG. 3*a* outputs a 0 value). After the transitioning of the pstrobe signal ("pstrobe2") from a high value to a low value, the first data signal can be latched. In this embodiment, the first data signal appears as win0data (see FIG. 4) a time delay later (e.g., $t_{Input}$ after the pstrobe transition and $t_{Sel}$ after the rptr transition) as long as the read pointer signal has a low value ("rptr"). At t=15 ns, the first component drives a second bit of data onto the data signal line. At three quarters of the system clock cycle, the first component then transitions the pstrobe signal to a high value and transitions the nstrobe signal to a low value. As described above with respect to FIG. 3*a*, the transition of the nstrobe signal from a high value to a low value is delayed by latch 22*c*.

Referring back to FIG., 4, the second data signal is received at the input of latches 51–58 and in particular latch 52. Subsequently, the nstrobe and wptrn0 signals will both have high values and the input data signal will appear at the output of the latch 52.

As shown in FIG. 5, the write pointer count for the nstrobe signal ("wptrn") is set to 0 (i.e., the two bit counter 81 in FIG. 3*b* outputs a 0 value). After the transitioning of the nstrobe signal ("nstrobe") from a high value to a low value, the second data signal can be latched. In this embodiment, the second data signal appears as win0data (see FIG. 4) a time delay later (e.g., $t_{Input}$ after the nstrobe transition and $t_{Sel}$ after the rptr transition). The third and fourth data signals are transferred from the first component to the second component in a like manner with the wptrp and wptrn values changing to 1. The fifth through eighth data signals are also transferred in a similar manner, except that the read pointer signal is set to a high value (e.g., these data signals appear at the output of multiplexers 60*a–d* a delay of $t_{Sel}$ after the rptr transition). In all, using this embodiment of the present invention, eight bits of data can be transferred between first and second components in 4 cycles of the system clock.

A method and apparatus has been described above where data and clocking signals are sent between first and second components and the data signals are latched based on the clocking signals. This manner for transmitting data between components can be extended to three or more components coupled to a common bus. As seen in FIG. 1, a third component 19 is coupled to clocking signal lines 14 and data signal lines 13 (e.g., that form part of a bus). Preferably, the data signal lines and clocking signal line(s) match (e.g., have the same length) so as to reduce clock skew between signals.

Figure 6:
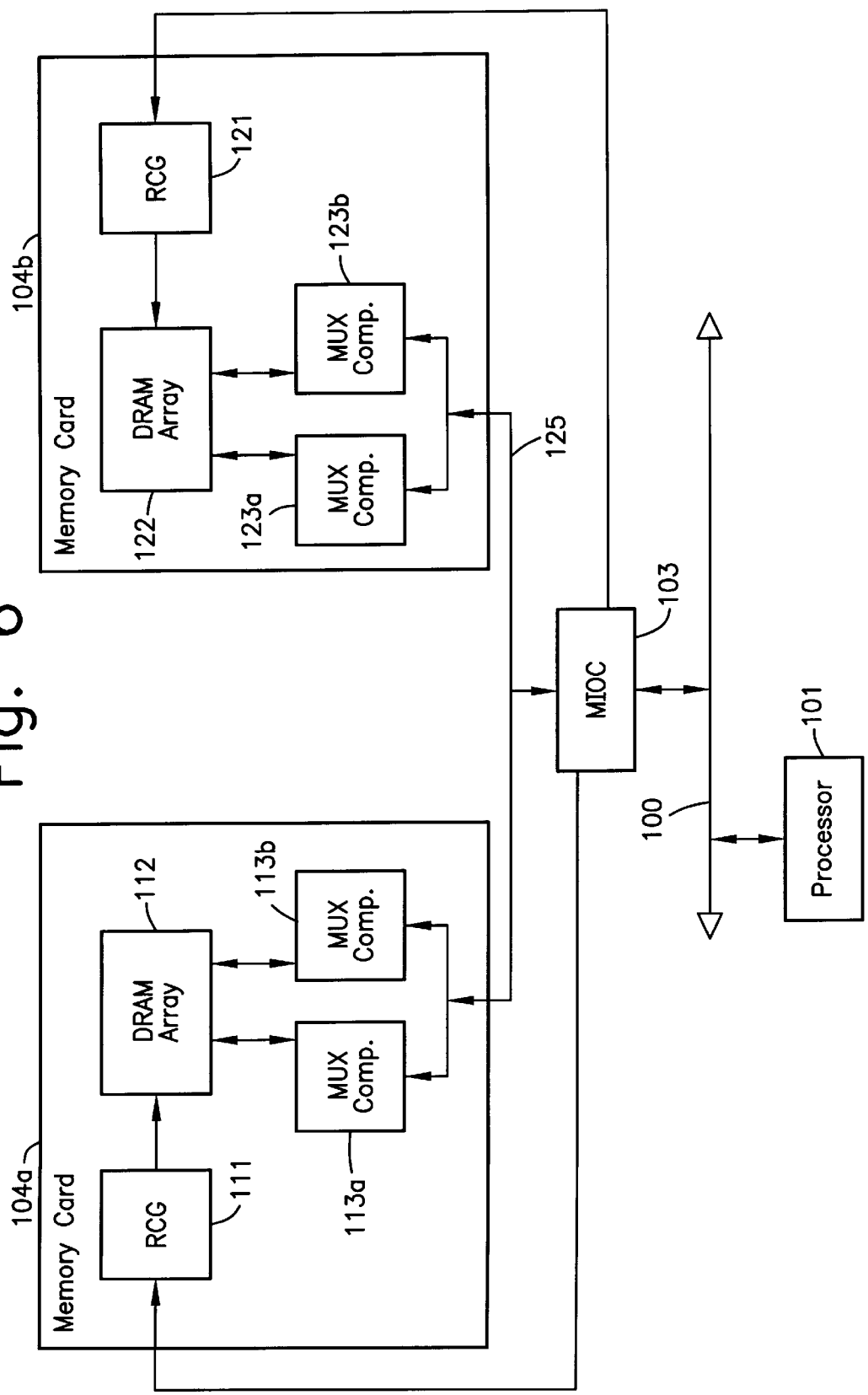
FIG. 6 is a block diagram of a system including a memory input/output controller and memory cards incorporating an embodiment of the present invention.

An example of a system using the present invention with three components is shown in FIG. 6. In this example, a processor 101, such as a Pentium® II processor manufactured by Intel Corporation, Santa Clara, Calif., is coupled to a host bus 100. A memory input/output controller (MIOC) 103 is coupled to host bus 100 and provides an interface between host bus 100 and memory cards 104*a* and 104*b*. MIOC 103 generates memory address and control signals that are transferred to a so-called "Ras Cas" generator (RCG) 111, 121 in memory cards 104*a*, 104*b*, respectively. RCGs 111, 121 generate Ras Cas addresses for dynamic random access memory (DRAM) arrays 112, 122. During read operations, data is transmitted from DRAM arrays 112, 122 to multiplexer (MUX) components 113*a–b* and 123*a–b*, respectively. In this example, MUX components 113*a–b* and 123*a–b* each receive/send 144 bits from/to DRAM arrays 112, 122, respectively, and transmit/receive data 72 bits at a time to/from MIOC 103 over memory data bus 125. In this example, memory data bus 125 includes 72 data signal lines and 8 clocking signal lines.

Using the embodiment of the present invention described with respect to FIGS. 1–5, each MUX component 113a–b and 123a–b and MIOC 103 is adapted to drive data signals onto the data signal lines with the pstrobe and nstrobe signals. In this example, 72 data bits are sent between the MIOC 103 and the MUX components 113a–b and 123a–b on each transition from a high value to a low value for the pstrobe and nstrobe signals. Accordingly, 288 (4×72) data bits (i.e., an entire cache line in many architectures) can be transferred in two system clock cycles.

Although an embodiment is specifically illustrated and described herein, it will be appreciated that modifications and variations of the present invention are covered by the above teachings and within the purview of the appended claims without departing from the spirit and intended scope of the invention. For example, though data is latched based on the high-to-low transition of the pstrobe and nstrobe signals, the embodiment described above can be modified so that data is latched on the low-to-high transition of the pstrobe and nstrobe signals. Also, more than two clocking signals can be used to further increase data transfer rates. Furthermore, one of the clocking signals (either pstrobe or nstrobe) can be used in transmitting the same amount of data by using the high-to-low and low-to-high transition of a single clocking signal.

What is claimed is:

1. An apparatus for transferring data signals between two components comprising:
   a first component;
   a second component;
   at least one data signal line coupled between said first and second components; and
   at least two bidirectional clocking signal lines coupled between said first and second components said at least two bidirectional clocking signal lines for supplying two clocking signals out of phase from one another by 180 degrees;
   each of said first and second components is adapted to transmit data signals over said data signal line and at least one clocking signal over said clocking signal line to another of said first and second components, and each of said first and second components is adapted to receive and latch data signals in relation to transitions of said clocking signals received from the other of said first and second components over both of said bidirectional clocking signal lines.

2. The apparatus of claim 1 wherein said data signals are latched when said clocking signal transitions from a high value to a low value.

3. The apparatus of claim 1 wherein said data signals are latched when either of said clocking signals transitions from a high value to a low value.

4. The apparatus of claim 1 wherein said first component is part of a memory card and said second component is part of a memory input/output controller.

5. An apparatus for transferring data signals among at least three components comprising:
   a bus including at least one data signal line and at least two bidirectional clocking signal lines, said at least two bidirectional clocking signal lines for supplying two clocking signals out of phase from one another by 180 degrees; and
   first, second, and third components coupled to said bus;
   each of said first, second, and third components is adapted to transmit a data signal over said data signal line and a clocking signal over said clocking signal line of said bus to an other of said components, and each of said first, second, and third components is adapted to receive and latch data signals in relation to transitions of said clocking signals received from another of said first, second, and third components over both of said bidirectional clocking signal lines.

6. The apparatus of claim 5 wherein said data signals are latched when said clocking signal transitions from a high value to a low value.

7. The apparatus of claim 5 wherein said data signals are latched when either of said clocking signals transitions from a high value to a low value.

8. The apparatus of claim 5 wherein said first and second components are part of respective first and second memory cards and said third component is part of a memory input/output controller.

9. A method for transferring data signals between two components coupled together via at least one data signal line and one bidirectional clocking signal line, comprising:
   (a) transmitting a data signal from one of a first and second components onto the data signal line;
   (b) transmitting two clocking signals from one of said first and second components onto the bidirectional clocking signal line wherein said two clocking signals are out of phase from each other by 180 degrees;
   (c) receiving said data signal from said data signal line by another of said first and second components;
   (d) receiving said clocking signal from said bidirectional clocking signal line by the other of said first and second components; and
   (e) latching said data signal by the other of said first and second components in relation to transitions of said clocking signals over both of said bidirectional clocking signal lines.

10. The method of claim 9 wherein during step (e), said data signals are latched when said clocking signal transitions from a high value to a low value.

11. The method of claim 9 wherein said data signals are latched when either of said clocking signals transitions from a high value to a low value.

12. A method for transferring data signals among at least three components coupled together via a bus including at least one data signal line and one bidirectional clocking line, comprising:
   (a) transmitting a data signal from one of said components onto the data signal line of the bus;
   (b) transmitting two clocking signals from one of said components onto the clocking signal line of the bus each of said clocking signals out of phase from each other by 180 degrees;
   (c) receiving said data signal from the data signal line of said bus by another of said components;
   (d) receiving said clocking signal from the clocking signal line by the other of said components; and
   (e) latching said data signal by the other said components in relation to transitions of said clocking signals over both of said bidirectional clocking signal lines.

13. The method of claim 12 wherein during step (e) said data signals are latched when said clocking signal transitions from a high value to a low value.

14. The method of claim 12 wherein said data signals are latched when either of said clocking signals transitions from a high value to a low value.

* * * * *

UNITED STATES PATENT AND TRADEMARK OFFICE
CERTIFICATE OF CORRECTION

PATENT NO. : 6,178,206 B1
DATED : January 23, 2001
INVENTOR(S) : Timothy W. Kelly; Stephen S. Pawlowski; Keith M. Self; Jeffrey E. Smith It is certified that error appears in the above-identified patent and that said Letters Patent is hereby corrected as shown below:

ABSTRACT,
Line 57, "presented where for" should be -- presented for --

Signed and Sealed this

Eleventh Day of December, 2001

Attest:

NICHOLAS P. GODICI
Attesting Officer
*Acting Director of the United States Patent and Trademark Office*